United States Patent [19]

Linnman et al.

[11] 4,175,255
[45] Nov. 20, 1979

[54] DEVICE TO PROTECT AGAINST FLOW OF CURRENT

[76] Inventors: Sven N. J. Linnman, Gottsundav. 13, S18400 Åkersberga; Peter Isoz, Åda Gård, 15014 Vagnhärad; Nils P. Branderud, Båtholmsb. 21nb, S 12742 Skärholmen; Per E. C. Udden, Box 90, S86100 Timrå, all of Sweden

[21] Appl. No.: 831,007

[22] Filed: Sep. 6, 1977

[51] Int. Cl.² .................. A61N 1/36; G08B 21/00; H05F 1/00
[52] U.S. Cl. .................................. 328/7; 128/908; 307/216; 340/650; 361/49
[58] Field of Search ............... 328/7, 259; 331/63; 361/42, 49, 93; 340/650; 128/2.1 P, 2.1 Z; 307/216, 237

[56] References Cited

U.S. PATENT DOCUMENTS

| | | | |
|---|---|---|---|
| 3,699,389 | 10/1972 | Holsinger | 128/2.1 P |
| 3,706,008 | 12/1972 | Kremer | 361/49 |
| 3,754,221 | 8/1973 | Stelter | 361/42 |
| 4,068,669 | 1/1978 | Niemi | 128/2.1 P |
| 4,080,640 | 3/1978 | Elms et al. | 361/49 |

OTHER PUBLICATIONS

IEEE Transactions on Biomedical Eng., "A Body Current Activated Circuit Breaker", by F. Kremer et al., 9/75.

Primary Examiner—Stanley D. Miller, Jr.
Assistant Examiner—B. P. Davis
Attorney, Agent, or Firm—Oblon, Fisher, Spivak, McClelland & Maier

[57] ABSTRACT

A protective device to interrupt the flow of current at a work place when current of a magnitude to endanger life flows through the body of a person whereby at least two electrodes with skin contact are applied on a person which electrodes are connected to a voltage sensor which determines the voltage difference between the electrodes when current flows through the body and is designed to release a signal to a circuit breaking device which interrupts the flow of current when the current passing through the body exceeds the admissible value.

5 Claims, 2 Drawing Figures

DEVICE TO PROTECT AGAINST FLOW OF CURRENT

BACKGROUND OF THE INVENTION

This invention relates to a protective device to interrupt the flow of current at a work place when current of a magnitude to endanger life flows through the body of a person.

Protective devices against a dangerous voltage are today available in the form of so-called ground connection breakers. They have the purpose of interrupting the main current when current flows between a phase winding of an alternating power source and ground so as to avoid fire as well as the occurrence of dangerous voltages in grounded equipment. Ground connection breakers are also available in designs which protect a person against life-endangering flows of current in case they get simultaneously into contact with a phase and the ground line. However, these breakers have only a limited application because they are very sensitive to leakage current. Moreover, they do not protect the persons when they touch simultaneously different phases.

A protective device is known from the U.S. Pat. No. 3,706,008. One of the disadvantages of this known device is the fact that the user is, in the real sense of the word, bound to his work place by means of the lines which connect the electrodes with the current breaking device. The current breaking device is designed as a control unit and is to be freedom of on a work table or such whereby the freedomof movement of the user is limited to a large degree by means of the lines connected to the unit.

SUMMARY OF THE INVENTION

Accordingly, it is an object of the invention under consideration to improve a protective device of the known type in such a manner that it guarantees a safe protection. It is another object of the invention to permit free movement by the user at his work place without being restrained by means of line connections to the control unit.

The problem is essentially resolved by means of this invention due to the fact that a current generator is provided which emits intermittent current impulses through two electrodes with the skin contact applied to the body of the user in order to measure the resistance between the electrodes whereby a voltage sensor is designed so as to give a signal to a current breaking unit and/or a separate signaling device when the voltage between the electrodes exceeds a given limit value.

According to the invention, it is of great importance that the protective device has a control circuit which continuously senses the condition of its switching network and releases a signal in case of possible errors or in case of a flow of current changed due to other reasons which, in its turn, acts upon the circuit breaking device. For example, the connection to one of the electrodes can be unintentionally interrupted. By the same token, the contact resistance between the skin and one of the electrodes can become inadmissibly high. The latter can occur when, for example, the person feels cold or when the skin is abnormally dry for other reasons. From the point of view of preventing accidents at the work place, the protective device according to this invention is far superior to the devices known so far, for example, those of the type as they are known from the above mentioned U.S. Pat. No. 3,706,008.

In the case of a preferred embodiment of the invention, a signal is transmitted in a wireless manner from the user to the circuit breaking device and this independently of where the person is in the room. This is, of course, also an essential advantage in comparison with the device according to the mentioned U.S. Pat. No. 3,706,008. This is particularly applicable to work in laboratories and such where the person is not only working at a certain work table but must be able to freely move about.

The signal can be transmitted from the voltage sensor to the circuit breaking device by means of sound, ultrasonics or radio waves but also by means of wires.

It is advantageous to design the voltage sensor as an exclusive-OR-gate.

BRIEF DESCRIPTION OF THE DRAWINGS

An example of a design of the invention is described below with the help of the drawings. There are shown.

DESCRIPTION OF THE PREFERRED EMBODIMENTS

Figure 1:
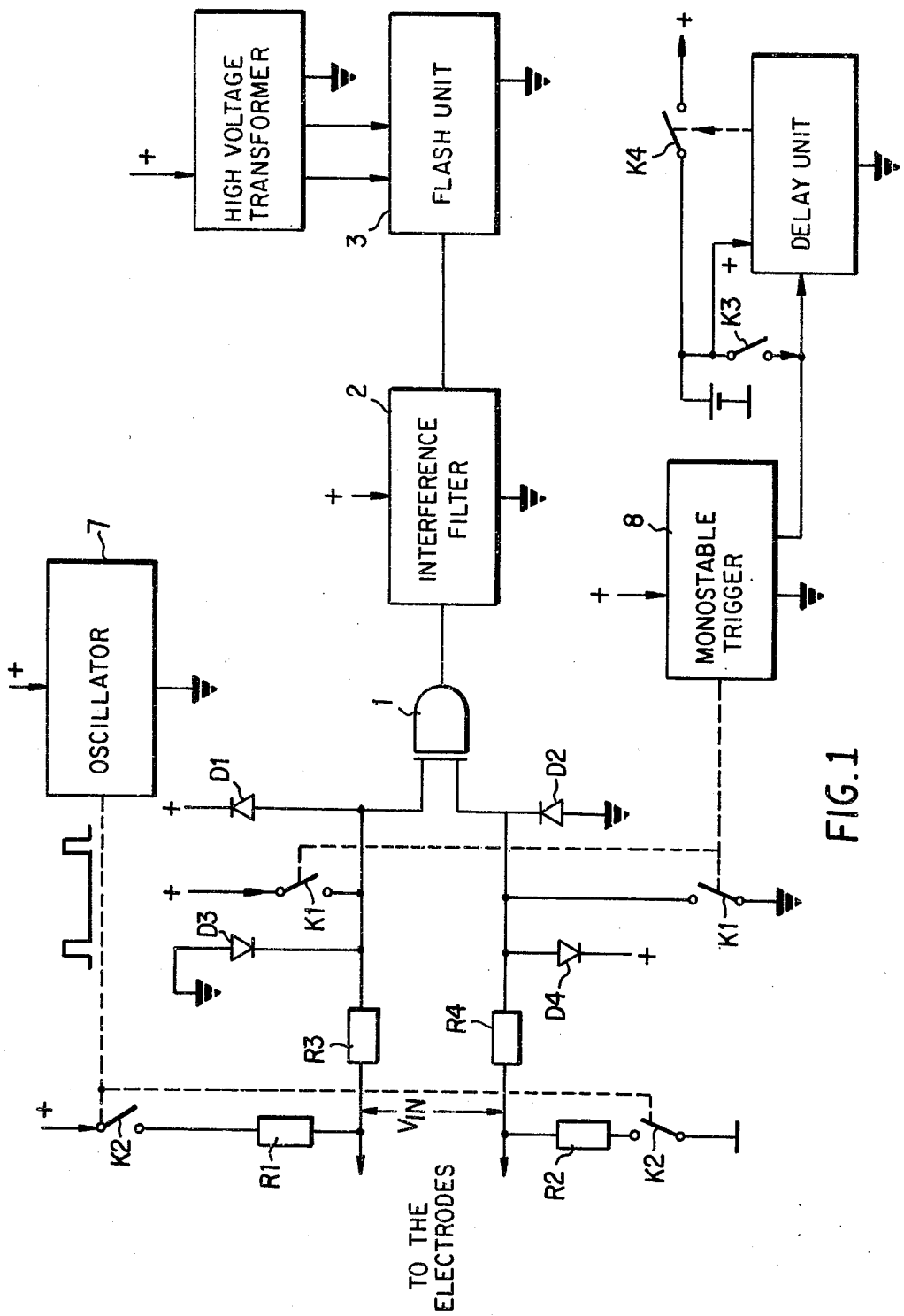
FIG. 1 a block wiring diagram of the part of the protective device worn by the user and FIG. 2 the stationary part of the protective device.

As mentioned above, the invention is based on the principle that a voltage is determined which develops between different points of the body when current flows between them. For example, when each of the electrodes shown in FIG. 1 are connected to a wrist, the voltage between the electrodes amounts to about 8 volts when current of 10 mA flows from one hand to the other through the body. However, when the current flows between a hand and the head or between a hand and a foot, a voltage drop develops which is about half the size of the voltage between the arms, i.e. approximately 4 volts. The electrodes can, for example, be designed as a metal wrist-watch band.

In FIG. 1, the voltage between the electrodes is given as $V_{in}$ and is supplied to an exclusive-OR-gate. A positive voltage level develops then at the outlet of the gate 1 independently of whether the input voltage $V_{in}$ is positive or negative. It is the purpose of the four diodes D1, D2, D3 and D4 to maintain the input voltage within the operational area of the gate. The gate has, furthermore, an interference suppressing function: for example, static electricity has an equally strong effect on both electrodes and, in this way, does not pass through the gate.

The resistors R3 and R4 protect the diodes D1 to D4 against overloading in case of a high input voltage at the electrodes.

Figure 2:
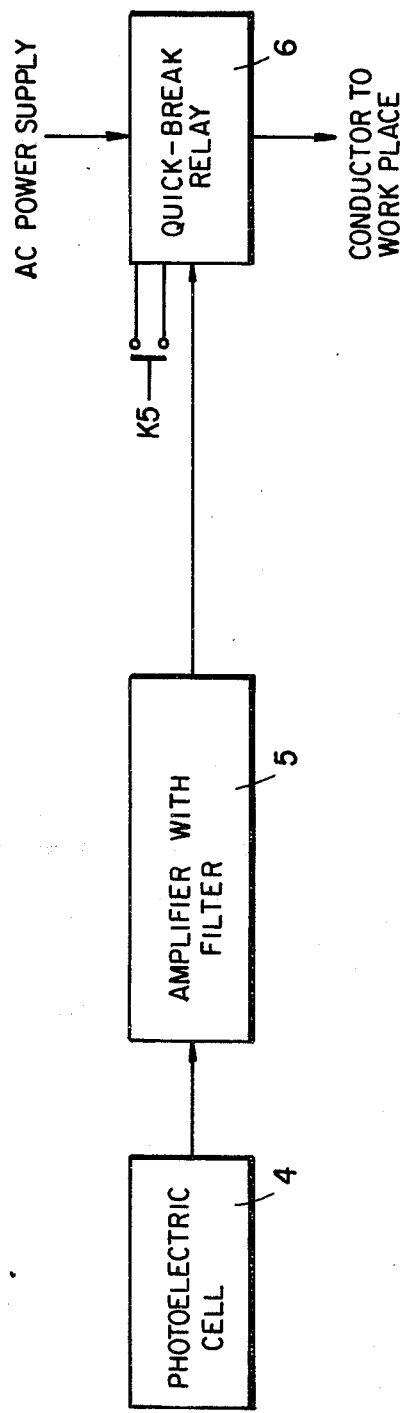

The outlet of gate 1 is connected to an interference filter 2 which is designed as a low-pass filter filtering off residual interferences which may pass through the gate when the electrodes are subjected to outside interferences of a varying magnitude. After the filtering, the signal is led to a flash unit 3 whereby a very short flash of light is released. This flash is of such particularly short duration so that it differs from other light signals as, for example, the flashing of fluorescent tubes. The light of the flash is detected by a stationary photoelectric cell 4 which is shown in FIG. 2. The signal is subsequently led from the photoelectric cell 4 to an amplifier 5 and its output signal is led to a quick-break relay 6 which cuts the current to the work place. The amplifier must contain a filter adapted to the signal which suppresses signals from other light sources than the signals from the flash of light and thus prevents the contact system to cut the current in the case of any light from other light sources, such as lamps, fluorescent tubes, etc. The relay is closed when the switch K5 is closed. When there is an interruption in the electrodes or a bad contact between the electrodes and the wrists, then the protective device does not function. There exists a special test circuit for this purpose. It operates in such a way that it measures the resistance between the electrodes at equal time intervals. When the resistance exceeds a certain value, the circuit emits an alarm signal. In order to measure the resistance between the electrodes, an oscillator 7 has been arranged which transmits intermittent voltage impulses to the protective device whereby the contacts K2 are closed. These voltage impulses are each supplied by both electrodes through two matching resistors R1 and R2 and when the circuit is interrupted between the electrodes or there occurs even a too high contact resistance, the input voltage $V_{in}$ becomes sufficiently high in order to release a signal which interrupts the current of the work place. When the switch K3 closes, then also the contact K4 closes and the parts of the protective device worn on the body start functioning.

When the switch K3 is actuated, the monostable trigger stage 8 emits an impulse which closes switch K1. In this way, a voltage is supplied to the inputs of the gate 1 and the flash is released. Owing to this fact, each time when the parts worn on the body are turned off, a control indication appears that all elements of the system are functioning.

The switch K4 switches the current supply of the device with a delay which is sufficient to have enough time left for the above mentioned test of the system so that it can be fully completed.

The invention is, of course, not limited to the transmission of signals with the help of flashes of light but can be applied in the same manner with a transmission of sound, ultrasonics, radio waves or wires. Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A protective device to interrupt the flow of current at a work place when current of a magnitude to endanger life flows through the body of a user comprising:
   at least two electrodes with skin contact for application to the body of a user;
   a voltage sensor connected to the electrodes for determining the voltage difference between the electrodes when a current flows through the body of the user and generating a signal when the voltage difference exceeds a given limit value;
   a circuit breaking device spaced from the voltage sensor and responsive to the signal for interrupting the flow of current; and
   a test oscillator for emitting intermittent voltage impulses through the electrodes to the body of the user.
2. A device according to claim 1 wherein the voltage sensor comprises an exclusive-OR-gate.
3. A device according to claim 1 including:
   a flash unit connected to the voltage sensor and operated by the voltage sensor for releasing a flash of light; and
   a photoelectric cell connected between the flash unit and the circuit breaking device for detecting the flash of light to activate the circuit breaking device.
4. A device according to claim 1 including:
   in interference filter connected to the voltage sensor.
5. A device according to claim 1 wherein the signal is transmitted by the voltage sensor to the circuit breaking device by means of a wire, sound or radio connection.

* * * * *